United States Patent
Rammhofer

(10) Patent No.: US 7,059,128 B2
(45) Date of Patent: Jun. 13, 2006

(54) HYDRAULIC SYSTEM FOR A MOTOR VEHICLE

(75) Inventor: Thomas Rammhofer, Sasbach (DE)

(73) Assignee: LuK Lamellen und Kupplungsbau Beteiligungs KG Buhl (DE)

( * ) Notice: Subject to any disclaimer, the term of this patent is extended or adjusted under 35 U.S.C. 154(b) by 353 days.

(21) Appl. No.: 10/601,068

(22) Filed: Jun. 20, 2003

(65) Prior Publication Data

US 2004/0065083 A1   Apr. 8, 2004

(30) Foreign Application Priority Data

Jun. 24, 2002   (DE) ............... 102 28 030

(51) Int. Cl.
*F15B 7/08*   (2006.01)
(52) U.S. Cl. .......................... 60/588; 92/248
(58) Field of Classification Search ........... 60/588, 60/589; 92/248
See application file for complete search history.

(56) References Cited

U.S. PATENT DOCUMENTS

| 4,785,721 | A | * | 11/1988 | Leigh-Monstevens et al. ............ 60/588 |
| 4,831,916 | A | | 5/1989 | Leigh-Monstevens et al. |
| 4,998,461 | A | | 3/1991 | Ishiwata et al. |
| 5,121,686 | A | * | 6/1992 | Schonlau et al. ............ 92/248 |
| 5,715,681 | A | * | 2/1998 | Williamson .................. 60/588 |
| 5,767,198 | A | * | 6/1998 | Shimizu et al. ............. 525/133 |
| 6,526,868 | B1 | * | 3/2003 | Winkelmann et al. ........ 92/172 |
| 6,769,254 | B1 | * | 8/2004 | Heller et al. .................. 60/588 |

FOREIGN PATENT DOCUMENTS

| DE | 37 13 248 A1 | 11/1988 |
| DE | 38 16 610 A1 | 11/1989 |
| DE | 41 04 504 A1 | 8/1992 |
| DE | 195 36 610 A1 | 4/1997 |
| DE | 100 49 913 A1 | 4/2001 |
| GB | 1 359 026 | 7/1974 |
| JP | 5-256364 A | 10/1993 |

* cited by examiner

*Primary Examiner*—Edward K. Look
*Assistant Examiner*—Michael Leslie
(74) *Attorney, Agent, or Firm*—Darby & Darby

(57) ABSTRACT

The piston in the master cylinder of a hydraulic system of the kind that is used particularly in motor vehicles is made of a duroplastic polymer material.

17 Claims, 2 Drawing Sheets

HYDRAULIC SYSTEM FOR A MOTOR VEHICLE

BACKGROUND OF THE INVENTION

The present invention relates to a hydraulic system of the kind that is used particularly in motor vehicles, which has a master cylinder with a housing and a piston arranged with axial mobility in the housing. The piston closes off a pressure compartment filled with a hydraulic fluid. When the master cylinder is actuated, the piston is moved by means of a piston rod and as a result, a pressure is applied to the hydraulic fluid. At least one sealing means is arranged between the housing and the piston. The hydraulic system further has a slave cylinder that is connected into the system through a pressure conduit.

A hydraulic system that meets the foregoing description is known for example from DE 100 49 913 A1. In particular in a case where polymer materials are used for the housing and/or piston, this hydraulic system suffers from a problem that is due to transverse forces acting on the piston as a result of swivel movements of the piston. The transverse forces cause abrasive wear on the piston surface and on the housing. As a consequence, if the polymer material of the piston and/or housing is reinforced with glass fibers, some of the fibers can be set free, which has a highly abrasive effect on the seals.

OBJECT AND SUMMARY OF THE INVENTION

The objective of the present invention is to provide a hydraulic system that is less prone to abrasive wear.

According to the invention, a hydraulic system that meets the foregoing objective has a master cylinder with a housing and a piston arranged with axial mobility in the housing. The piston closes off a pressure compartment filled with a hydraulic fluid. When the master cylinder is actuated, the piston is moved by means of a piston rod and as a result, a pressure is applied to the hydraulic fluid. At least one sealing means is arranged between the housing and the piston. The hydraulic system further has a slave cylinder that is connected into the system through a pressure conduit. In accordance with the invention, the piston is made of a duroplastic polymer. Preferred duroplastic materials are known under the trade names Vyncolite G920, X680, X681, X682, and X689. In addition to providing a solution to the problem stated above, it has been found that a piston made of a duroplastic material does not require any additional special lubrication.

In a preferred embodiment of the invention, the duroplastic material contains at least one of the materials melamine and/or phenolic resin and/or epoxy resin and/or unsaturated polyester and/or silicone resin and/or urea and/or formaldehyde as a component.

The piston may in addition contain PTFE (polytetrafluoroethylene) and/or molybdenum disulfide ($MoS_2$) and/or graphite. Combinations containing these materials result in optimal wear properties of the master cylinder.

Preferably, the duroplastic materials is reinforced with glass fibers. The proportion of glass fibers may be in the range between 1% and 50% by weight.

In a preferred embodiment, the duroplastic material is reinforced with globular glass beads. The glass beads may be used in addition or as an alternative to the glass fibers. The proportion of the glass beads may be in the range between 1% and 50% by weight. The diameter and other parameters of the glass beads can be varied within wide ranges. It is preferred to use conventional commercially available glass beads.

In a further developed version of a hydraulic system according to the invention, the housing may in addition contain PTFE. This leads to a further improvement in the gliding properties of the piston inside the housing and contributes further to preventing the abrasion of surface material.

In a preferred embodiment of the hydraulic system, the surface of the piston has a surface finish with an average surface roughness value between about 0.1 µm and about 2 µm, preferably around 0.3 µm. The surface of the piston may have a maximum-depth roughness value in the range between about 1 µm and about 10 µm, preferably around 4.5 µm. The surface of the piston may have a bearing ratio of about 30% to 80%. Experiments have shown that a surface according to the foregoing specifications provides optimal results in pistons and housings with the material combinations according to the invention.

In a preferred embodiment of the hydraulic system according to the invention, the piston has at least one snifting groove arranged preferably on the axially facing front side of the piston. In comparison to an arrangement of the snifting grooves on the circumference of the piston, the arrangement on the end surface improves the snifting play and the dynamic snifting properties. The piston has preferably several snifting grooves distributed over the perimeter of the axially facing piston surface. The snifting grooves can be distributed evenly or unevenly over the perimeter. The depth of a snifting groove is about 0.5 to 1.5 mm, measured from the axially facing surface of the piston. This geometry of the snifting grooves results in optimal self-venting and snifting properties.

The piston preferably has a bore cavity containing a ball joint that is connected to the piston rod. The geometry of the bore and the ball joint is configured to allow a vertical swivel range of about 4° in the upward direction as well as 4° in the downward direction and a horizontal swivel range of about 10° to each side. In the pulled-back position of the piston, the piston rod can thus be hooked up for example to a pedal pin of a vehicle.

In a preferred embodiment of the invention, the piston rod is equipped with a first end-stop plate effective in the pull direction. Likewise in a further preferred embodiment, the piston rod is equipped with a second end-stop plate effective in the push direction. Relative to the actuating direction, the end-stop plates are arranged ahead of and behind the holder bracket. Forces on the piston rod such as a shock from an abrupt actuation are transmitted directly from the end-stop plates into the holder bracket. Thus, the force is not transmitted through the piston but is directed through the holder bracket directly into the swage fitting.

BRIEF DESCRIPTION OF THE DRAWINGS

An embodiment of the invention will be presented in further detail in connection with the attached drawings, wherein.

DETAILED DESCRIPTION OF THE INVENTION

Figure 1:
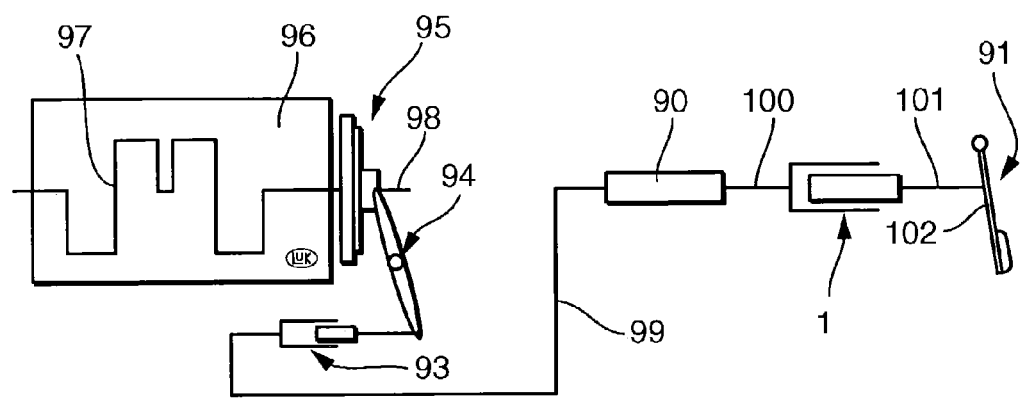
FIG. 1 represents a schematic view of a hydraulic system illustrated through the example of a clutch release device.

FIG. 1 schematically illustrates a possible configuration of a hydraulic system with a pressure-limiting valve 90 as used in a clutch release device 91 with a master cylinder 1 and a slave cylinder 93. The pressure-limiting valve 90 in the illustrated example is installed between the conduit sections 99 and 100, which are separated from each other in the closed state of the valve. Obviously, in different embodiments the pressure-limiting valve 90 could be integrated in the master cylinder 1 or in the slave cylinder 93. In other hydraulic systems such as brake systems, power-steering systems and the like, the pressure-limiting valve could be integrated in a functional component of the system. A pressure-limiting valve according to the invention can be used to advantage in any hydraulic system as a pressure-limiting device and/or as an oscillation filter, e.g., to prevent pedal vibrations.

The clutch release system 91 performs a hydraulic clutch-pedal actuation when a force is applied to the master cylinder 1 by means of an actuating member 102, which can be a pedal or an actuator device such as an electrical actuator or the like. As a consequence of the force applied to the master cylinder through a mechanical transfer link 101, a pressure is built up in the master cylinder 1 and propagated through the conduit section 100, the pressure-limiting valve 90 and the conduit section 99 to the slave cylinder 93. The slave cylinder could be arranged so that it concentrically surrounds the transmission input shaft 98. In the axial direction, the slave cylinder can have the transmission housing (not shown) as a support base and apply the required clutch-release force by way of a release bearing to the clutch 95 or, more specifically, to the release elements of the clutch such as a diaphragm spring. The illustrated embodiment has a slave cylinder 93 that actuates the release bearing through a release mechanism 94 and is arranged outside of the bell housing of the clutch. The slave cylinder 93 communicates hydraulically with the master cylinder 1 and by means of the slave cylinder piston applies an axially directed force to the release mechanism 94. To take up the reaction to the axially directed release force, the slave cylinder 93 is installed in a fixed condition on the transmission housing (not shown) or on another component that is fixed on the transmission housing. When the clutch 95 is engaged, the transmission input shaft transmits torque from the combustion engine 96 to a transmission (not shown) and subsequently to the driven wheels of a motor vehicle.

Due to the phases of the internal combustion process in the engine 96, the crankshaft 97 is subject to a non-uniform torque load dependent, e.g., on the number of cylinders of the engine. The non-uniform engine output manifests itself through axial vibrations and/or tumbling oscillations of the crankshaft, which are transferred through the release mechanism 94 to the slave cylinder 93 and through the conduit system 99, 100 to the master cylinder 1, from where the vibrations travel through the mechanical connection 101 to the actuating member 102. If the actuating member 102 is a clutch pedal, the vibrations are felt by the driver as an irritating disturbance. If the actuating member 102 is an actuator device rather than a clutch pedal, the vibrations may impair the regulating precision or shorten the useful life of the actuator. The pressure-limiting valve 90 is therefore installed between the conduit sections 99 and 100 and appropriately tuned as a means for damping the vibrations that are introduced through the crankshaft, which are typically in a frequency range between 50 and 200 Hz.

Figure 2:
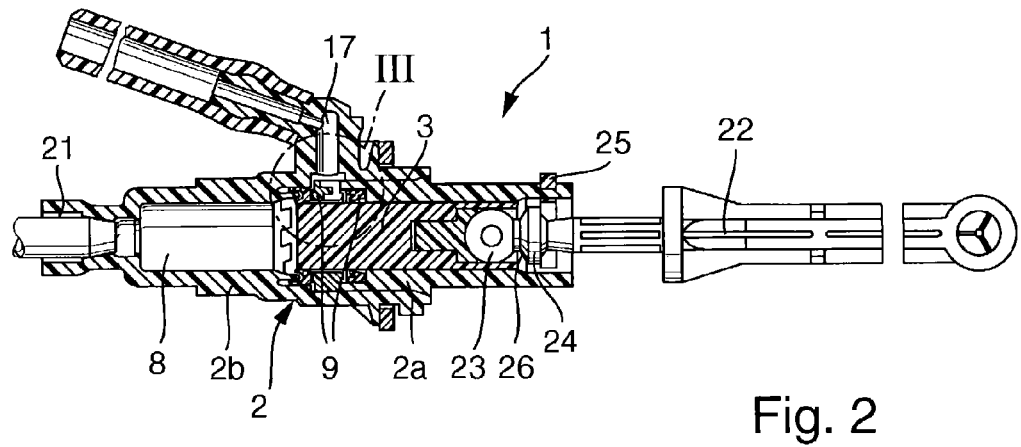
FIG. 2 represents a sectional view of a master cylinder.
Figure 3:
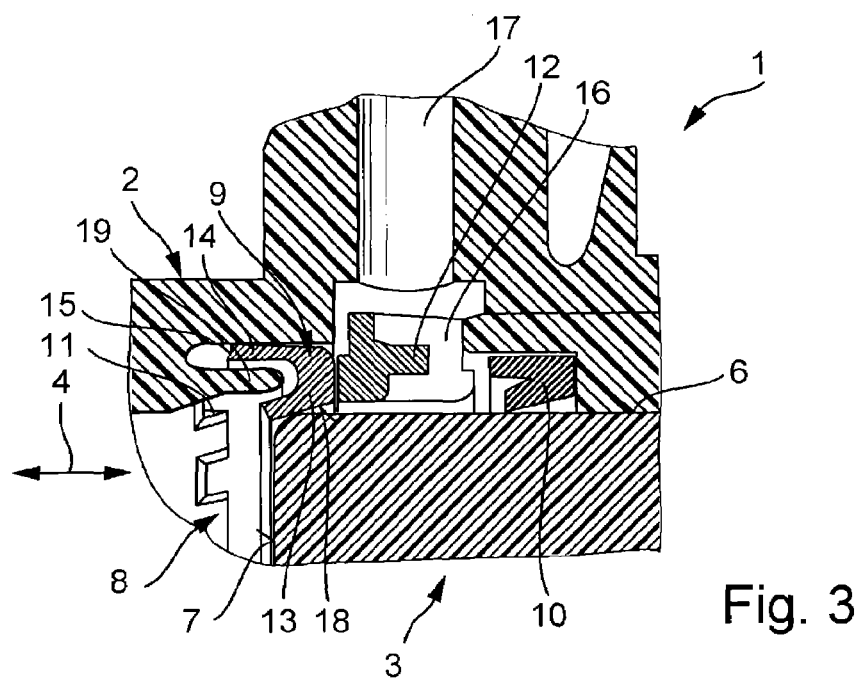
FIG. 3 represents a partial sectional view of a master cylinder.

FIG. 2 represents a sectional view of a master cylinder 1, and FIG. 3 shows an enlarged detail of the master cylinder 1 in the area of the piston 3 and the inlet port. The master cylinder 1 according to FIG. 2 has a housing 2 which is composed of a swage fitting 2a and an anterior housing part 2b. The piston 3, which is arranged inside the housing 2, encloses together with the housing 2 a pressure compartment 8. By way of a pressure port 21, the pressure compartment 8 can be connected to a conduit 99, 100 of a hydraulic system in accordance with FIG. 1. The master cylinder 1 further has a compensation—and inlet port 17 that serves for the venting of the pressure compartment 8. The piston 3 is connected by means of a piston rod 22 to a clutch—or brake pedal or to an actuator or similar element (not shown in FIG. 2). The piston rod 22 is coupled to the piston 3 by means of a ball joint 23. An end-stop plate 24 is arranged on the side of the ball joint 23 that faces away from the piston 3. The end-stop plate 24 is shaped asymmetrically and in the installed condition of the piston allows for an up/down swivel angle of ±4° and a lateral swivel range of 10° to either side to provide the necessary mobility for hooking up the piston rod 22 for example to a pedal pin or similar element. The rearward movement of the piston 3 is limited by a holder bracket 25, as the end-stop plate 24 runs against the holder bracket 25. This arrangement provides a constraint in the pull-out direction of the piston. In addition, another stop on the piston rod works in the push direction of the piston.

To allow the piston rod 22 to be installed on the pedal, it is necessary that the piston rod in the retracted position can be swiveled by 10°. The holder bracket 25 has to be set in a vertical position (The swage fitting 2a is designed so that it can only be installed in the correct orientation). In addition, the swage fitting 2a has an opening shaped to allow the swivel movement of the piston rod 22 and the end-stop plate 24 in the retracted position of the piston.

Experiments have shown that the piston is forced apart when a pulling force is applied. This causes the piston 3 to burst, because duroplastic materials cannot tolerate tensile stresses. In order to shorten the force-propagation path, the end-stop force for the retracted piston rod 22 is not transmitted through the piston as was the case in previous designs, but is transferred directly from the piston rod 22 by way of the holder bracket 25 into the swage fitting 2a. Experiments with letting the pedal snap back have shown that the force acting on the stop can be as large as 1500 N.

The first end-stop plate 24 has a conical shape in order to ensure a uniform force introduction into the holder bracket 25 even when the piston rod is positioned at an angle to the cylinder axis. Since the required swivel angles are only 4° in the vertical direction, but about 10° in the horizontal direction, it is necessary to either provide the swage fitting 2a with a free space or to design the first end-stop plate 24 with an asymmetric shape. A second end-stop plate 26 is likewise shaped as a plate and arranged on the piston rod 22. The holder bracket 25 is located between the first end stop 24 and the second end-stop 26. The second end stop 26 limits the travel of the piston 3 when the master cylinder 1 is actuated. The first end stop 24 limits the travel when the actuation force is removed from the master cylinder 1.

The master cylinder 1 illustrated in FIG. 3 includes in essence a housing 2 and a piston 3 that is arranged in the housing with axial mobility. The axial direction is indicated by the bi-directional arrow 4 in FIG. 3. In front of the end face 7 of the piston, the housing 2 encloses a pressure compartment 8. The housing 2 has an axially aligned dead-end bore guiding the piston through contact between the cylinder wall of the bore and the piston surface 6. On the opposite side from the end face 7, the piston 3 is coupled through a mechanical link 101 to an actuating member 102 in accordance with FIG. 1, for example a clutch pedal, a brake pedal, or an actuator device, e.g., with an electrically powered actuator, to establish a force-transmitting connection.

The pressure compartment 8 is connected with a slave cylinder 93 (not shown in FIG. 3), for example through a hydraulic conduit 99, 100. In the installed condition of the master cylinder 1, the pressure compartment 8 is filled with hydraulic fluid.

To seal the pressure compartment 8 inside the housing 2, the hydraulic cylinder has a primary seal 9 and a secondary seal 10, which are arranged in a substantially cylindrical rear portion 11 of the housing 2. The rear portion 11 has a larger inside diameter than the pressure compartment 8. A space holder 12 is arranged between the primary seal 9 and the secondary seal 10, extending over at least a part of the circumference, so that the axial positions of the primary seal 9 and the secondary seal 10 are defined precisely or with a narrow play between appropriate internal projections of the housing 2.

The primary seal consists of a seal ring body 13 with a sealing collar 14 in snug contact with the housing 2. A sealing lip 15 extends from the seal ring body 13 in the same direction as the sealing collar 14, slanted at an angle towards the central axis of the housing.

A compensation—and inlet compartment 16 between the primary seal 9 and the secondary seal 10 is connected by way of a compensation—and inlet port 17 to a compensation reservoir (not shown in FIG. 3).

The side of the sealing lip 15 that faces the piston 3 forms a sealing surface 18. In the illustration of FIG. 3, the piston 3 is pulled back from the pressure compartment 8 to a position where the sealing lip 15 is separated by a gap from the piston surface 6. As the piston 3 is moved in the direction of the pressure compartment 8, the gap between the piston surface 6 and the sealing lip 15 or more precisely, the sealing surface 18, is closed. In the position of the piston 3 that is shown in FIG. 3, the compensation—and inlet compartment 16 as well as the pressure compartment 8 share the same pressure with the compensation reservoir. Depending on its configuration, the compensation reservoir (which is not shown in the drawing) can be either at ambient pressure or at a different pressure that can be set by the compensation reservoir.

When the piston 3 is moved further in the direction of the pressure compartment 8, a pressure can be built up in the pressure compartment and transmitted to actuate the slave cylinder 93. In this state, the pressure in the pressure compartment 8 also extends to the space between the sealing lip 15 and an internal projection 19 of the housing, so that the sealing lip 15 or, more precisely, the sealing surface 18 is pressed against the piston surface 6.

If the mechanical force on the piston 3 is reduced, the force exerted by the pressure in the pressure compartment 8 will drive the piston back into the position shown in FIG. 3.

Figures 4, 5:
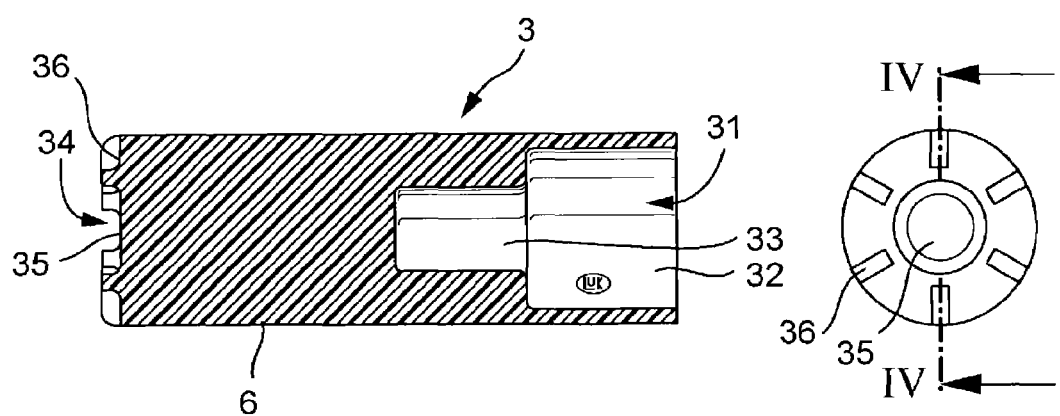
FIG. 4 represents a sectional view of a piston seen from the side.
FIG. 5 shows the end of the piston seen in the axial direction.

FIG. 4 represents a sectional view of the piston 3 seen from the side. At its rearward-facing end, the piston has a stepped bore 31 with a first step 32 and a second step 33. At the frontal surface 34, the piston 3 has a dish-shaped central depression 35. Snifting grooves 36 are distributed over the circumference of the frontal surface, as shown in FIG. 5. In the illustrated embodiment, the snifting grooves 36 run substantially in radial directions and are uniformly distributed over the circumference. However, the number, depth and arrangement of the grooves can be arbitrarily modified. In particular, the snifting play can be adjusted by changing the depth of the grooves. The snifting grooves 36 in the illustrated embodiment are about 0.5 to 1.5 mm deep. The piston 3 is made of one of the following materials: Vyncolite G920 with a 35% content of long glass fibers; Vyncolite X680 with a 35% content of short glass fibers and 15% glass beads; Vyncolite X681 with a 35% content of short glass fibers, 15% glass beads, and 5% polytetrafluoroethylene (PTFE); Vyncolite X682 with a 35% content of short glass fibers, 15% glass beads, and graphite; or Vyncolite X689 with a 35% content of short glass fibers, 15% glass beads, and $MoS_2$.

A particularly preferred material combination for a piston is Vyncolite X680 with phenolic molding compound PF, 35% glass beads as well as a 15% content of short glass fibers.

Compared to steel or aluminum as a piston material, there is substantially more design freedom in the geometry of the snifting grooves 36. By modifying the geometry of the snifting grooves 36, the functions of releasing the residual pressure, self-venting, and dynamic snifting play can be optimized.

According to the invention, the piston surface 6 has an average roughness value $R_a$ between about 0.1 μm and about 2 μm, preferably around 0.3 μm, as well as a maximum-depth roughness value $R_{max}$ in the range between about 1 μm and about 10 μm, preferably around 4.5 μm. The surface of the piston may have a bearing ratio $T_A$ of about 30% to 80%. This kind of surface finish can be obtained in the manufacturing process for example by using a die-casting mold in which the respective surface is polished. The foregoing roughness parameters conform to the definitions of DIN4768, Part 1.

What is claimed is:

1. A hydraulic system comprising:
    a master cylinder with a housing;
    a piston arranged with axial mobility to slide in the housing;
    a pressure compartment inside the housing, said pressure compartment being filled with a hydraulic fluid and closed off by the piston;
    a piston rod connected to the piston;
    a sealing means arranged between the housing and the piston;
    a slave cylinder; and
    a hydraulic fluid conduit between the master cylinder and the slave cylinder;
    wherein an application of force to the piston rod causes the piston to move in an axial direction and to put the hydraulic fluid under pressure; and
    wherein the piston comprises a duroplastic polymer material and at least one material from the group consisting of polytetrafluoroethylene, molybdenum disulfide, and graphite.

2. The hydraulic system of claim 1, wherein the duroplastic polymer material comprises at least one component from the group of materials consisting of melamine, phenolic resin, epoxy resin, unsaturated polyester, silicone resin, urea, and formaldehyde.

3. The hydraulic system of claim 1, wherein the duroplastic polymer material is reinforced with glass fibers.

4. The hydraulic system of claim 3, wherein the proportion of the glass fibers is substantially in a range between 1% and 50% by weight.

5. The hydraulic system of claim 1, wherein the duroplastic polymer material is reinforced with globular glass beads.

6. The hydraulic system of claim 5, wherein the proportion of the glass beads is substantially in a range between 1% and 50% by weight.

7. The hydraulic system of claim 1, wherein the piston comprises a piston surface with a surface finish having an average roughness substantially in a range between 0.1 μm and about 2 μm.

8. The hydraulic system of claim 1, wherein the piston comprises a piston surface with a surface finish having a maximum-depth roughness substantially in a range between 1 μm and 10 μm.

9. The hydraulic system of claim 1, wherein the piston comprises a piston surface with a surface finish having a bearing ratio substantially in a range between 30% and 80%.

10. The hydraulic system of claim 1, wherein the piston comprises at least one snifting groove.

11. The hydraulic system of claim 10, wherein the piston has a front surface facing the pressure compartment and the at least one snifting groove is arranged on said front surface.

12. The hydraulic system of claim 11, wherein the at least one snifting groove comprises a plurality of snifting grooves distributed over a circumference of said front surface.

13. The hydraulic system of claim 10, wherein the at least one snifting groove has a depth substantially in a range between 0.5 mm and 1.5 mm.

14. The hydraulic system of claim 1, wherein the piston has a bore cavity containing a ball joint that is connected to the piston rod.

15. The hydraulic system of claim 1, comprising a first end-stop plate that is arranged on the piston rod and limits movement in a pull direction of the piston rod.

16. A hydraulic system comprising:
   a master cylinder with a housing comprising polytetrafluoroethylene;
   a piston arranged with axial mobility to slide in the housing;
   a pressure compartment inside the housing, said pressure compartment being filled with a hydraulic fluid and closed off by the piston;
   a piston rod connected to the piston;
   a sealing means arranged between the housing and the piston;
   a slave cylinder; and
   a hydraulic fluid conduit between the master cylinder and the slave cylinder;
   wherein an application of force to the piston rod causes the piston to move in an axial direction and to put the hydraulic fluid under pressure; and
   wherein the piston comprises a duroplastic polymer material.

17. A hydraulic system comprising:
   a master cylinder with a housing;
   a piston arranged with axial mobility to slide in the housing;
   a pressure compartment inside the housing, said pressure compartment being filled with a hydraulic fluid and closed off by the piston;
   a piston rod connected to the piston;
   a second end-stop plate that is arranged on the piston rod and limits movement in a push direction of the piston rod;
   a sealing means arranged between the housing and the piston;
   a slave cylinder;
   a hydraulic fluid conduit between the master cylinder and the slave cylinder;
   wherein an application of force to the piston rod causes the piston to move in an axial direction and to put the hydraulic fluid under pressure; and
   wherein the piston comprises a duroplastic polymer material.

* * * * *